United States Patent
Habacker (10) Patent No.: US 7,503,617 B2
(45) Date of Patent: Mar. 17, 2009

(54) CONVERTIBLE VEHICLE

(75) Inventor: Norbert Habacker, Bramsche (DE)

(73) Assignee: Wilhelm Karmann GmbH, Osnabruck (DE)

( * ) Notice: Subject to any disclaimer, the term of this patent is extended or adjusted under 35 U.S.C. 154(b) by 0 days.

(21) Appl. No.: 11/662,862

(22) PCT Filed: Sep. 12, 2005

(86) PCT No.: PCT/DE2005/001588

§ 371 (c)(1),
(2), (4) Date: Sep. 26, 2007

(87) PCT Pub. No.: WO2006/039881

PCT Pub. Date: Apr. 20, 2006

(65) Prior Publication Data

US 2008/0122249 A1   May 29, 2008

(30) Foreign Application Priority Data

Sep. 14, 2004  (DE) .................... 10 2004 044 908

(51) Int. Cl.
B60J 7/00 (2006.01)
(52) U.S. Cl. .................................................. 296/121
(58) Field of Classification Search ............ 296/121, 296/136.04, 216, 107.01
See application file for complete search history.

(56) References Cited

U.S. PATENT DOCUMENTS

| 3,089,719 | A | | 5/1963 | Csizmansky | |
| 4,817,999 | A | * | 4/1989 | Drew | 296/121 |
| 5,058,939 | A | * | 10/1991 | Miilu | 292/110 |
| 5,413,390 | A | * | 5/1995 | Filippi | 296/121 |
| 5,435,615 | A | * | 7/1995 | Schmitz | 296/121 |
| 6,036,254 | A | * | 3/2000 | Ritter et al. | 296/121 |
| 6,758,511 | B2 | * | 7/2004 | Taylor et al. | 296/121 |
| 7,407,201 | B2 | * | 8/2008 | Pfertner et al. | 296/121 |
| 2002/0021021 | A1 | * | 2/2002 | Schutt et al. | 296/107.09 |
| 2006/0006669 | A1 | * | 1/2006 | Nelsen et al. | 292/216 |

FOREIGN PATENT DOCUMENTS

| DE | 3917284 | 11/1990 |
| DE | 4415969 | 11/1995 |
| DE | 19935738 | 7/1999 |
| DE | 19801852 | 2/2001 |
| DE | 19943315 | 4/2001 |
| DE | 19944615 | 4/2001 |
| EP | 1072456 | 1/2001 |

* cited by examiner

Primary Examiner—Kiran B. Patel
(74) Attorney, Agent, or Firm—Gifford, Krass, Sprinkle, Anderson & Citkowski, P.C.

(57) ABSTRACT

The invention relates to a cabriolet vehicle comprising a displaceable roof which can be maintained in the closed position thereof at a point on the windscreen frame. According to the invention, at least one displaceable engaging element and one spring-loaded pivotable drive lever which engages in a direct or indirect manner with said element is provided for the movement thereof in or out of the engaged position for the maintenance thereof. The cabriolet vehicle is embodied in such a manner that the pivotable drive lever, which acts against the spring force with a component which is oriented away from the pivotable axis of the pivotable drive lever and which also enables the pivotable drive lever to be displaceably mounted.

13 Claims, 9 Drawing Sheets

CONVERTIBLE VEHICLE

REFERENCE TO RELATED APPLICATIONS

This application is the United States national phase of Patent Cooperation Treaty application No. PCT/DE05/001588, filed Sep. 12, 2005, which claims priority to German patent application No. DE10 2004 044908.2, filed Sep. 14, 2004, the entire content of both of which are incorporated herein by reference.

FIELD OF THE INVENTION

The invention relates to convertible roofs for automotive vehicles and, more particularly, to a latch mechanism for securing a roof to a windshield of an automotive vehicle.

BACKGROUND OF THE INVENTION

A number of convertible vehicles are known in which the movable roof can be secured to the windshield frame of the vehicle in its closed position via, for example, two laterally outwardly disposed engagement members, for instance rotary latches, arresting hooks or similar, and for which purpose the engagement members are connected to a central drive.

DE 44 15 969 C2 shows a convertible vehicle of this type in which a shaft, which is disposed substantially transversely to the vehicle and is termed a threaded cable 7 there, can be rotated and thereby rotates a spindle 9 on which a slider 10 is translatorily movable transversely to the vehicle. This slider takes along a further and stepped lever guided between two cylinder bars on its movement via a curved track guide, said lever being in contact via its step with the front edge of a spring-loaded pivotable drive lever, called an adjustment lever 36 there. The front edge is disposed opposite the pivot axis 37 of the pivotable adjustment lever. An inward and outward pivoting of the adjustment lever 36 is controlled by the displacement of the stepped lever in that the step impacts onto the front edge and, on the further displacement, counteracts a spring acting on the adjustment lever 36. Since the step initially abuts in front of the edge and has to be pushed over it on the displacement of the connector, the force development is not favorable and a high force effort is required. An exact track guide of the stepped connector is required for this. In particular due to the linear guide elements provided therefore, the construction is complex and heavy, and moreover requires a substantial construction space in the transverse direction of the vehicle, which is not expedient in view of the tight space requirements in a roof peak or for a head impact in this region which is as defused as possible.

Thus, it remains desirable to provide an improved roof closing mechanism for securing the roof to the vehicle windshield.

SUMMARY OF THE INVENTION

According to one aspect of the invention, a convertible vehicle includes a movable roof which can be held in its closed position at a windshield frame, with at least one movable engagement member being provided for holding and a spring-loaded pivotable drive lever engaging indirectly or directly thereat being provided for its movement into or out of the engagement position, characterized in that the pivotable drive lever is transposable by means of at least one pivot connector which is movable with respect to the pivotable drive lever on action against the spring force at least regionally with a component leading away from the pivot axis of the pivotable drive lever and thereby transposes the pivotable drive lever.

A favorable introduction of force for the transposition of the pivotable drive lever against its spring force is made possible by the invention. The pivot connector acting on the pivotable drive lever can describe a circular path with its tip and, in this process, press the pivotable drive lever down against its spring force in a continuous and slowly increasing manner without a jump in the required force being required at any time. At the same time, the construction space required in the transverse direction of the vehicle is substantially reduced since the pivot connector required for the movement of the pivotable drive connector can be held within the transverse extent of the pivotable drive connector during every phase of the movement.

The end of the pivot connector remote from its pivot axis is particularly advantageously rollable or slidable at a rear section of the drive lever, with the end of the pivot connector remote from its pivot axis in particular being provided with a roller for a low force effort and a low-wear running.

If the pivot connector runs through an angular position disposed perpendicular to its plane of extent during its influencing of the pivotable drive lever and the slide-off or roll track of the tip of the pivot connector provides an abutment for the tip of the pivot connector at the pivotable drive lever at least in the closed position of the roof, said pivot connector can be secured in an over dead center position in the closed position so that the spring force acting on the pivotable drive lever secures the pivot connector in the direction of the abutment in a force-loaded manner and thus secures the closing position.

Pull-push bars can advantageously be used for remote actuation. An opening and closing of the roof can thus also be possible via a manual actuation—unlike with a rotating threaded cable.

With such a force introduction via pull-push bars from a drive disposed spaced apart, it is favorable for the pivotable drive lever to be spring-loaded and for a pulling force on the bars to counteract the spring. The pull-push bars thereby only have to transmit large forces in the pulling direction and are supported by the spring in the pushing direction. The bars can thus have small dimensions.

DETAILED DESCRIPTION OF THE DRAWINGS

Further advantages and features of the invention result from an embodiment of the subject matter of the invention shown schematically in the drawing and described in the following descriptions.

DETAILED DESCRIPTION OF THE INVENTION

Referring to the figures, a convertible vehicle according to the invention is indicated at 1. The vehicle 1 includes a movable roof 3, which can be actuated between a closed or extended position extending over a passenger compartment and an open or retracted position disposed in a stowage space disposed adjacent to the passenger compartment. The roof 3 includes a "roof peak" or front end 4 toward a direction of travel F. Described in greater detail below, the vehicle 1 includes a pair of latches or closing devices 9 for releasably coupling the front end 4 of the roof 3 to a windshield frame 5 of the vehicle 1 and securing the roof in the extended position.

Each closing device 9 includes an engagement body 6. The engagement bodies 6 extend outwardly and laterally in a transverse direction q in the vehicle. The engagement bodies 6 are generally hook shaped and are pivotable around horizontal axes. The number of engagement bodies is also variable. A central engagement member may, for example, be provided.

The engagement members 6 are movable via force communicators 7 starting from an actuation member 8, which is central here, and in each case outwardly engaging with an at least substantial extent in the transverse direction q of the vehicle. The force communicators 7 are configured as pull-push bars and thus also permit a manual actuation, for instance by a pivotable handle, in addition to the use of an electrical or hydraulic drive. The actuation member 8 can also be disposed off-center with respect to the transverse extent of the vehicle.

The two engagement members 6 here have no spatially fixed pivot axis with respect to the roof 3, but are held movably, on the one hand, via a pivotable drive lever 10 which engages at the axle 11 at the engagement member 6 and, on the other hand, by an oppositely disposed control lever 12 which engages at the axle 13 at the engagement body 6. The control lever 12 here engages around the hook 6 in the manner of a fork.

The pivotable drive lever 10 is in turn pivotably supported at an axle 14 spatially fixed with respect to the roof peak 4 and is pre-tensioned downwardly by the spring force 15 in the direction of the force arrow 17 and thus in the closing direction of the hook 6.

The control lever 12 is likewise pivotably supported at an axle 16 spatially fixed with respect to the roof peak 4, with the axles 14 and 16 being disposed parallel to one another, but on different sides of the engagement member 6. The movable axles 11 and 13 are also disposed parallel to the spatially fixed axles 14, 16 at all times.

The pull-push bars 7 each engage at a joint 18 at an actuation lever 19 which is pivotably supported on an axle 20 spatially fixed with respect to the roof peak 4 and disposed further below. A pivot lever 22 is also pivotably supported on this axle 20 at a fixed angle 21 to the actuation lever 19 and is thus pivotable in an equally sized excursion by pivoting the actuating lever 19 via the pull push bar 7.

The pivot lever 22 is configured in the manner of a cam and can have a sliding piece or, as here, a roller 23 at its end remote from the pivot axle 20 with which it is capable of rolling or sliding on a back portion 24 of the pivotable drive lever 10.

The back portion 24 is configured as a recessed track here and has at least one boundary edge 25 which ensures that the rolling path of the roller 23, and thus the pivot angle of the pivot lever 22, is bounded. In the closed position (FIG. 3, FIG. 4) of the roof 3, this permits a very advantageous over dead center position of the pivot lever 22 which secures the closed position.

The movement procedure for the opening of an engagement member 6 from its closed position securing the roof 3 at the windshield frame 5 into the open position is shown respectively in the FIGS. 4 to 6 and 7 to 9. The pivotable drive lever 10 is pre-tensioned at all times in the direction of the arrow 17 in the clockwise direction around its axis 14 by its spring 15 which can also be configured differently than shown here. It is therefore necessary to work against this force during the opening, for which purpose the pivot lever 22 serves.

Figure 1:
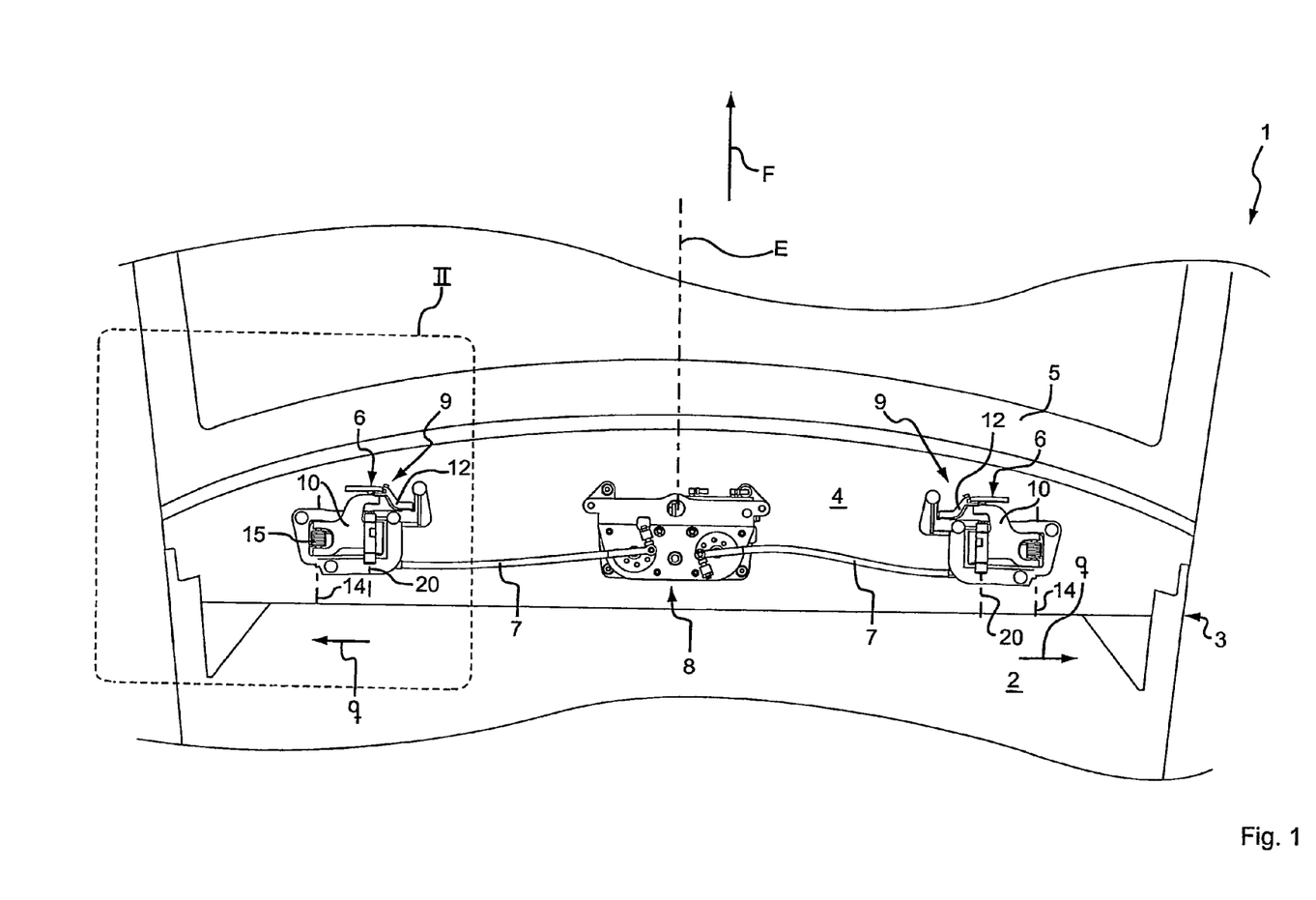
FIG. 1 shows a view from below into the vehicle in accordance with the invention having the front roof end (roof peak) with an indicated roof cover and with a windshield frame only indicated schematically and transparently with a central actuating member and laterally outwardly disposed engagement members for latching (not shown here) to the windshield frame which are in operative communication with the actuating member via pull-push bars.
Figure 2:
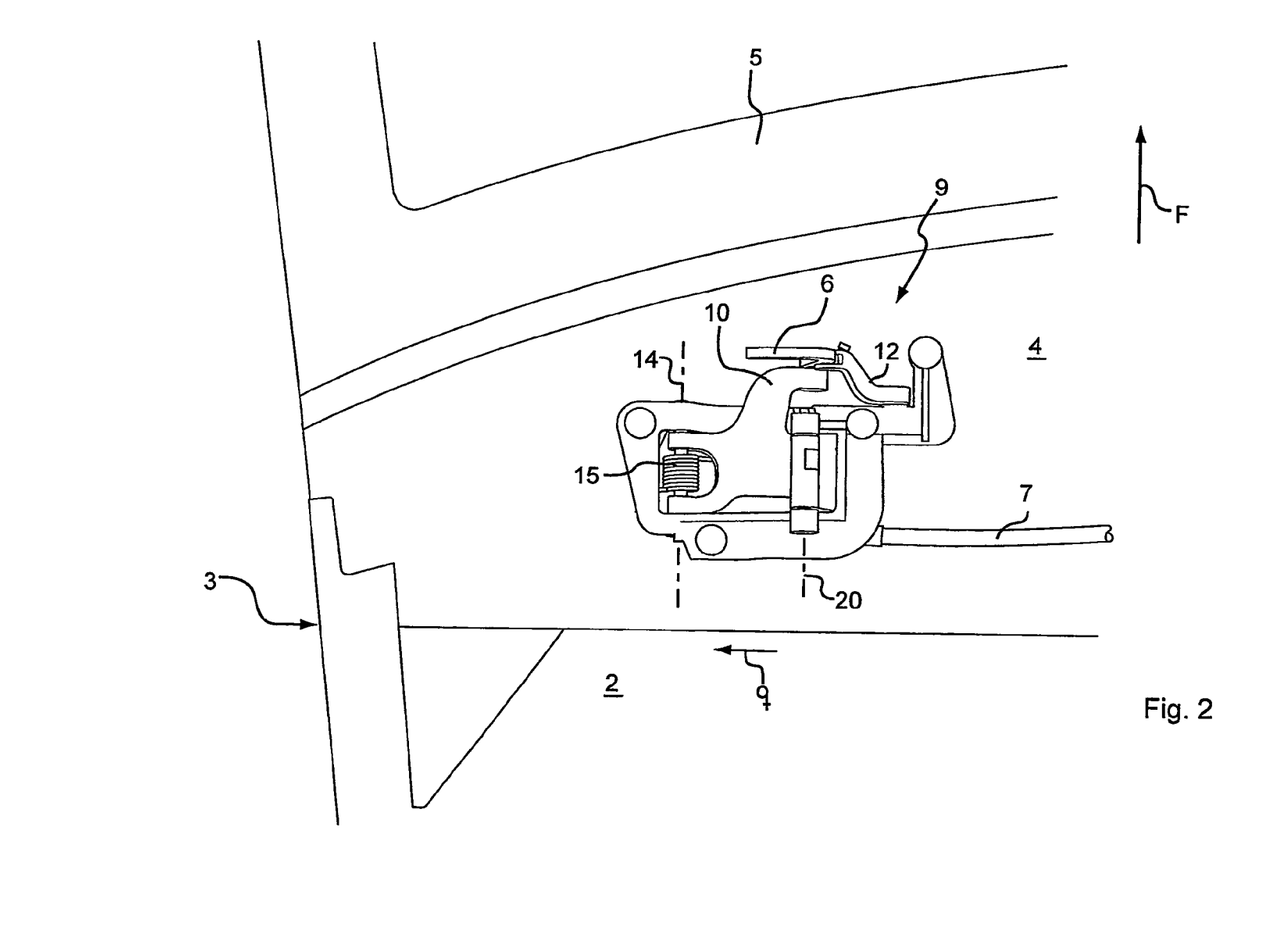
FIG. 2 shows the detail II in FIG. 1.
Figure 3:
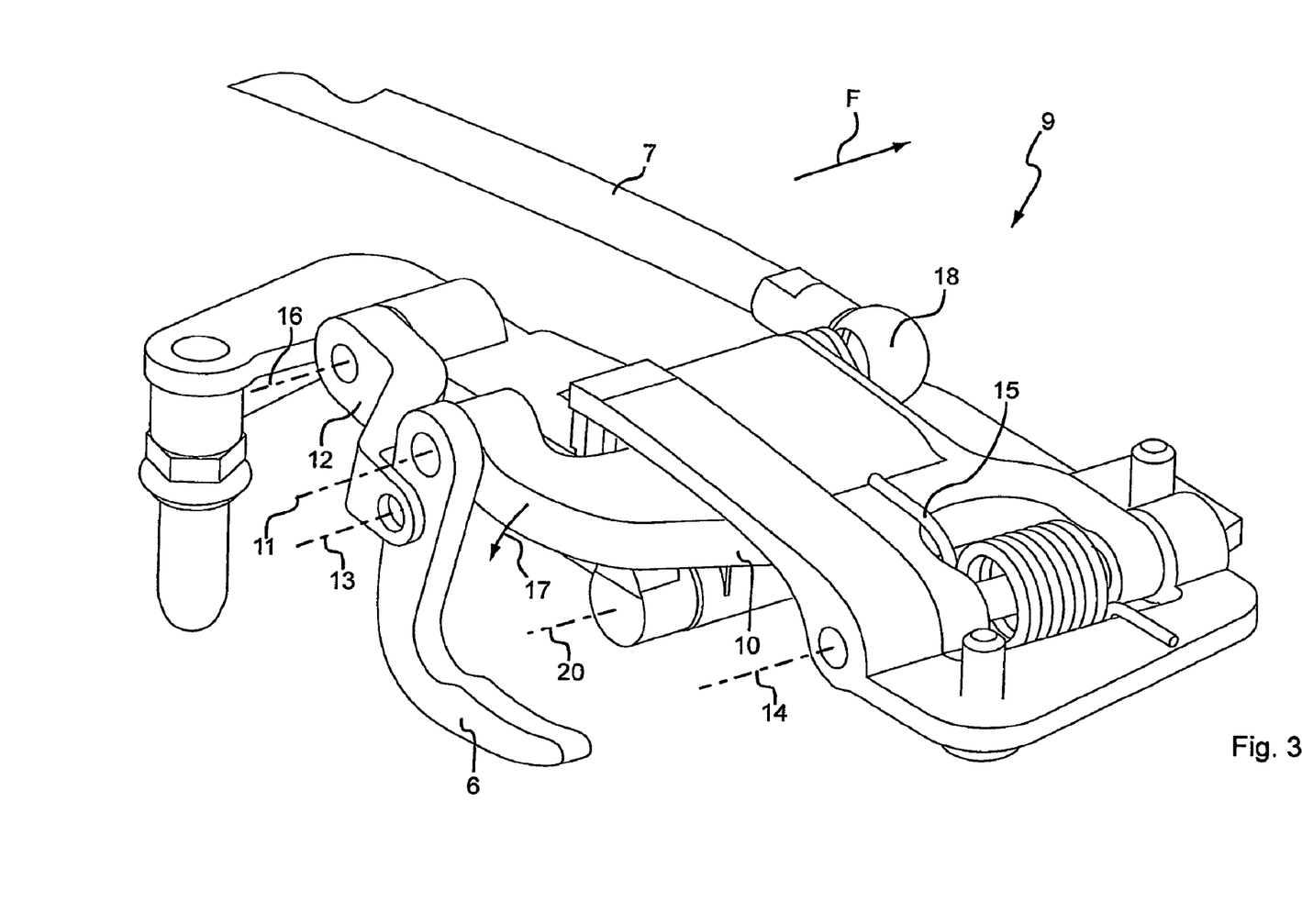
FIG. 3 shows a perspective view from obliquely above of the closing apparatus shown in FIG. 2 in the closed position of the engagement member.
Figure 4:
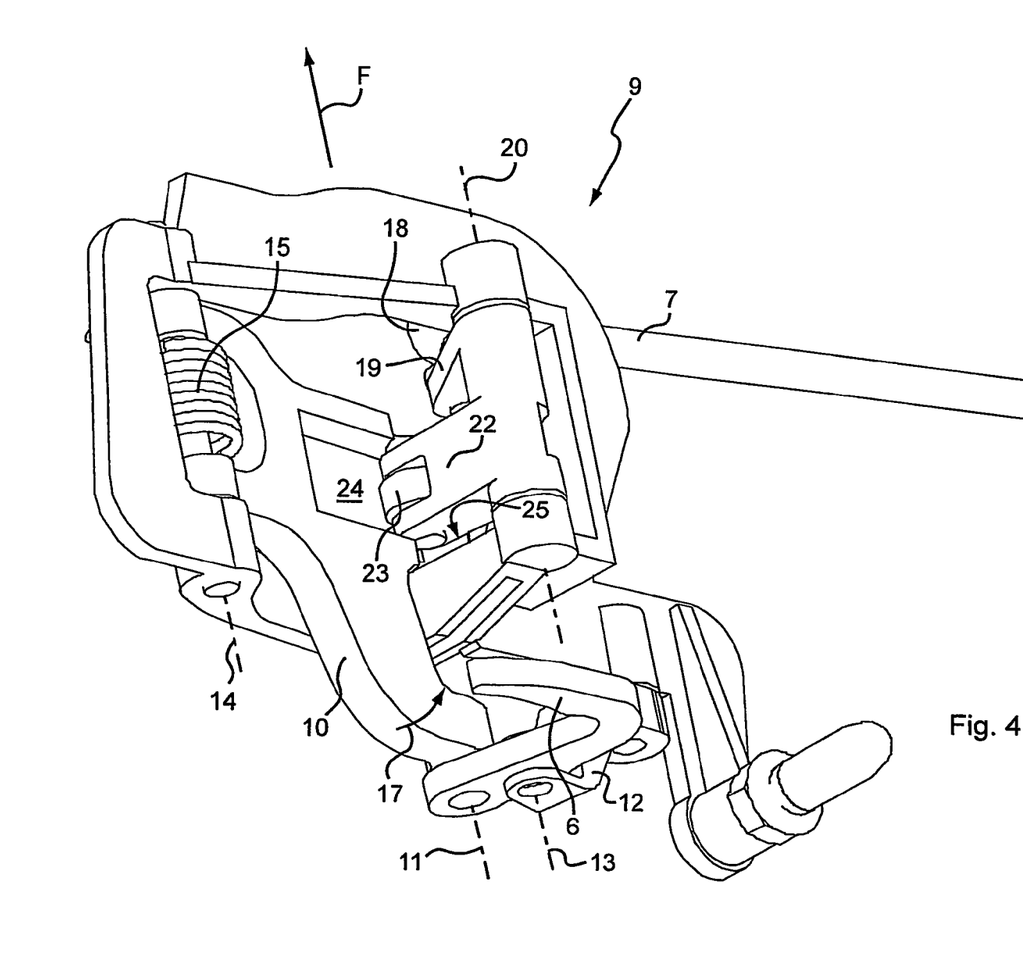
FIG. 4 shows a perspective view from obliquely below of the closing apparatus in the closed position of FIG. 3.
Figure 5:
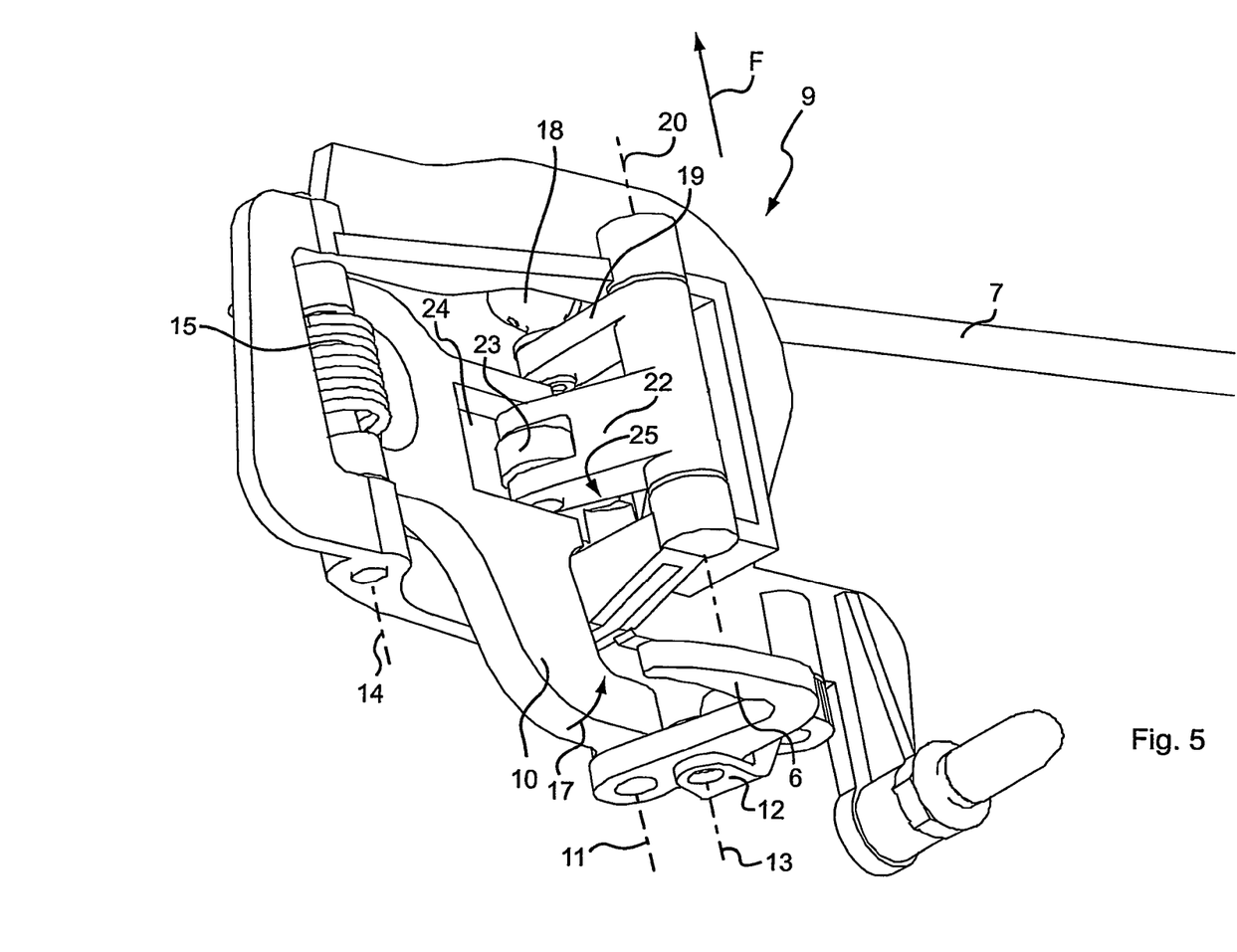
FIG. 5 shows a similar view to FIG. 4 during the opening of the engagement member by pushing out the pull-push bar transversely outwardly.
Figure 6:
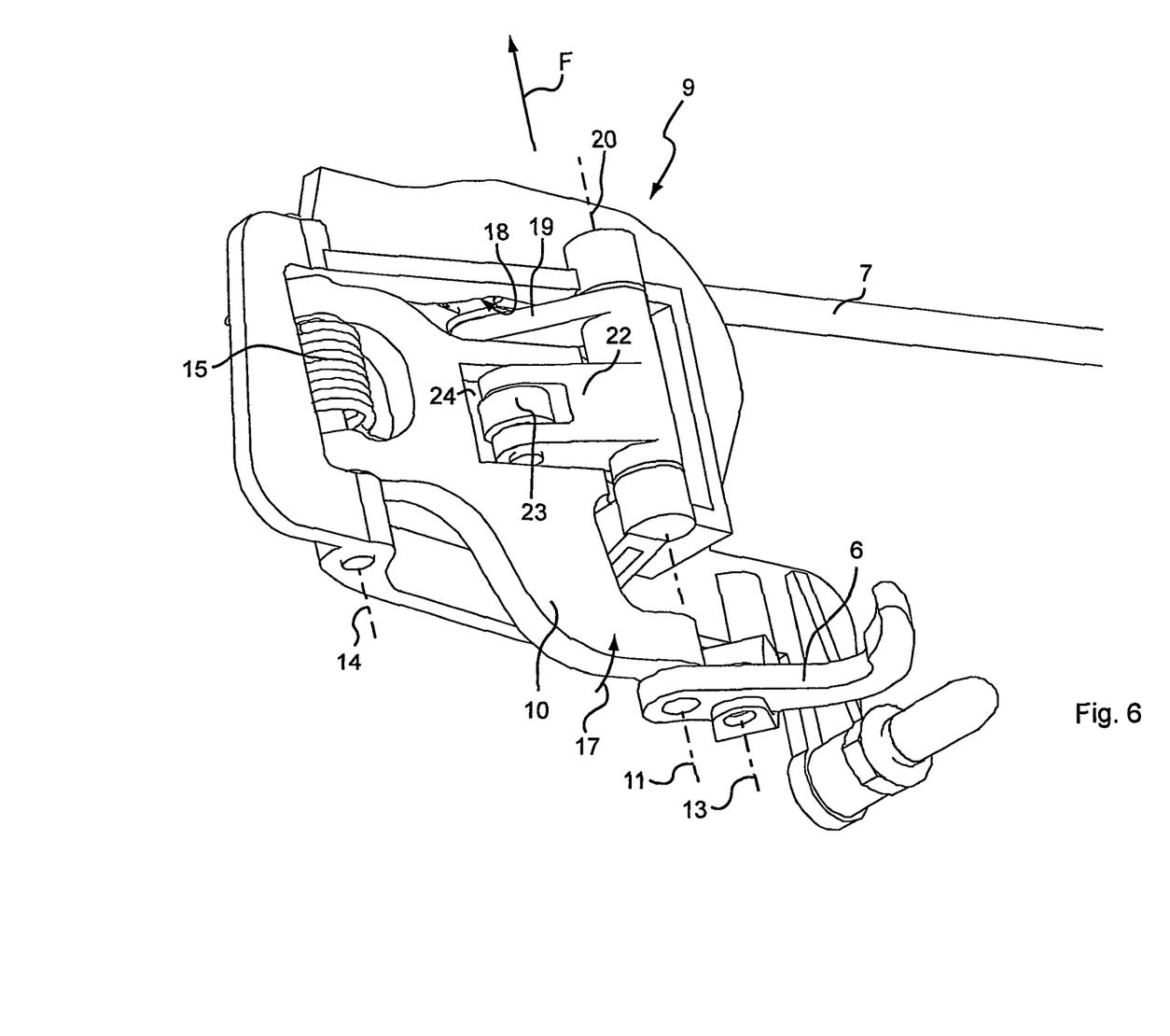
FIG. 6 shows a similar view to FIG. 5 in a completely open position of the engagement member.
Figure 7:
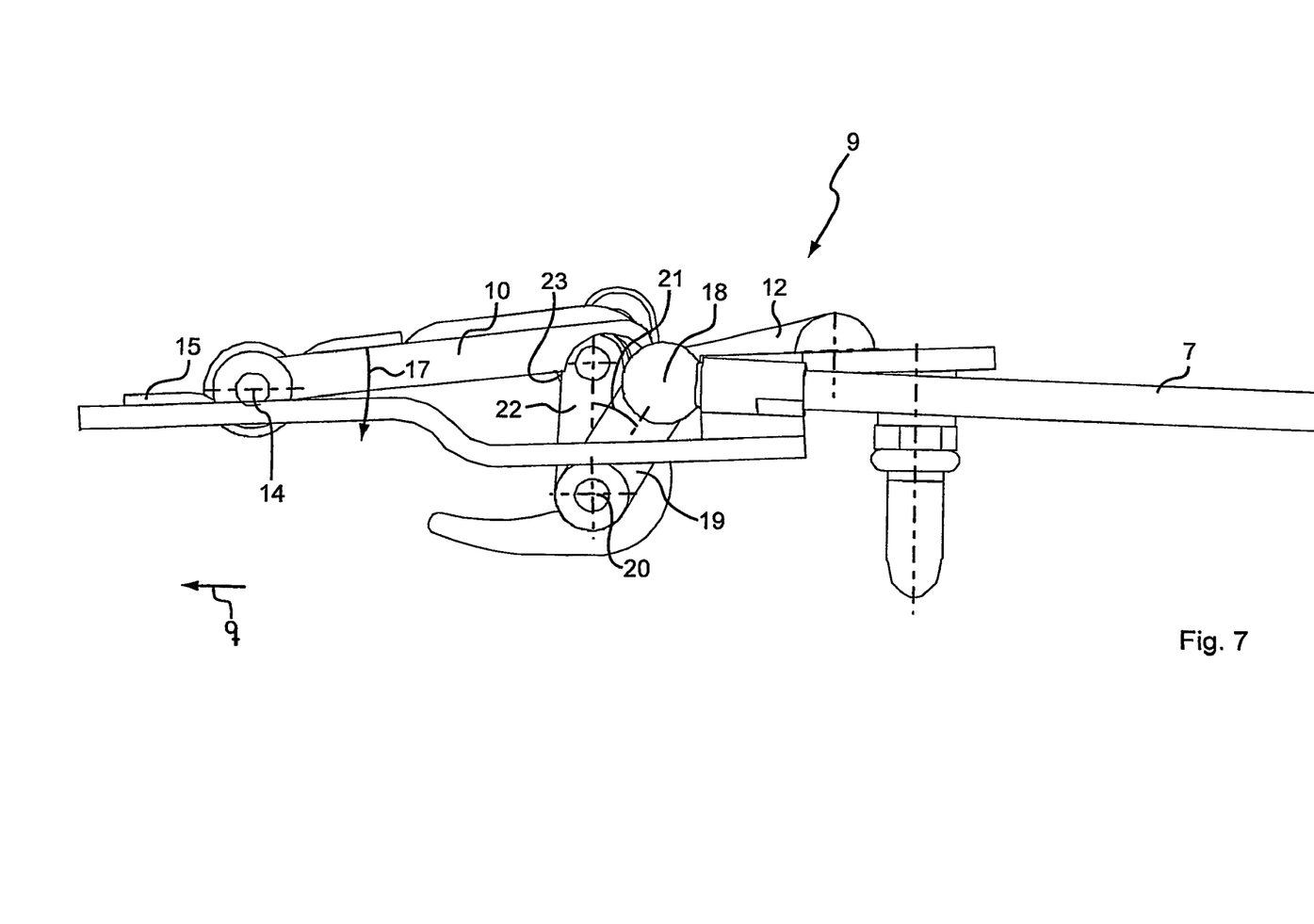
FIG. 7 shows the closing device in the position of FIG. 4 in a view from the front.
Figure 8:
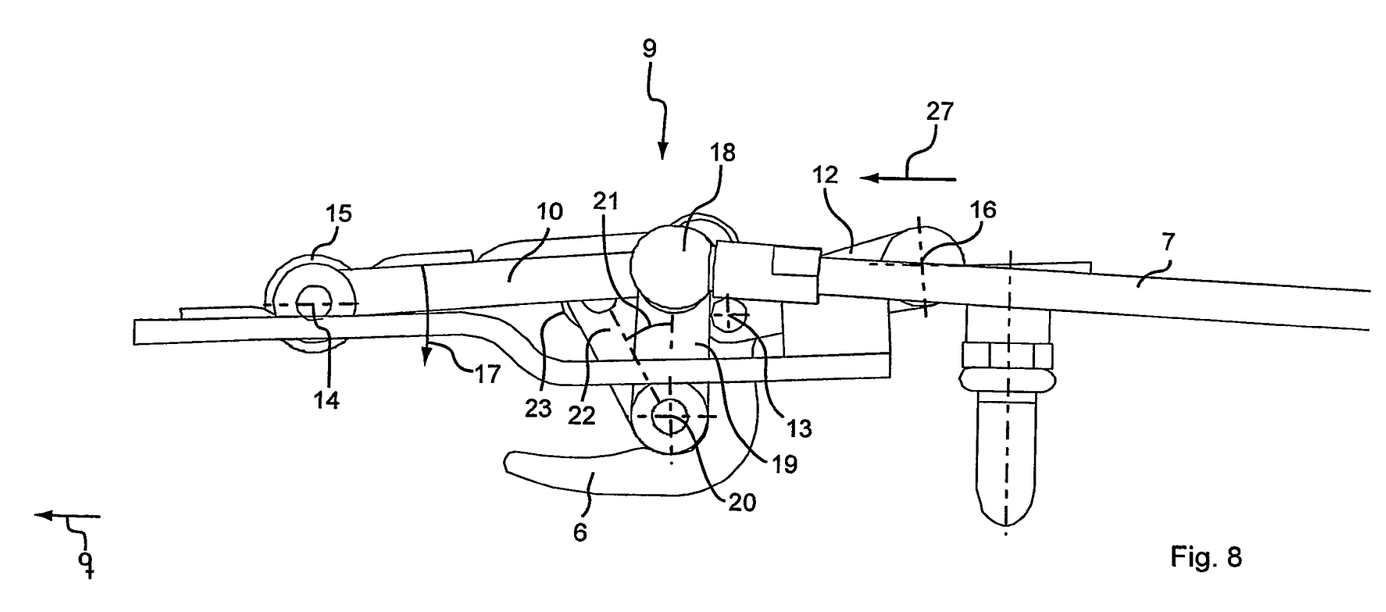
FIG. 8 shows the closing device in the position of FIG. 5 in a view from the front.
Figure 9:
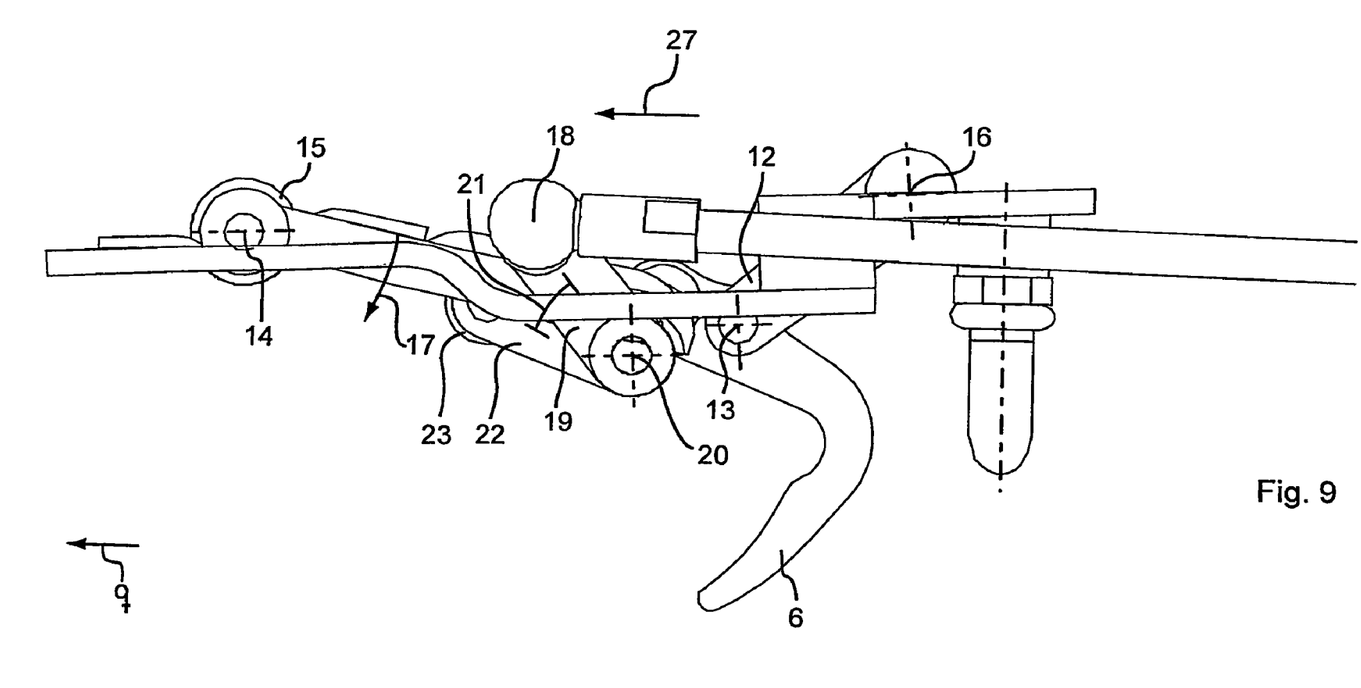
FIG. 9 shows the closing device in the position of FIG. 6 in a view from the front.

In the initially closed position, which is also shown in FIGS. 1 to 3, the pivot lever 22 contacts the edge 25 with its free end remote from its axis 20 and here provided with the roller 23; in this process it would initially have to run through a pivot position perpendicular to the plane of extent of the pivotable drive lever 10 on the starting opening from this position. The closed position is therefore a self-securing over dead center position, as already indicated above. A force acting in the sense of opening of the roof 3 and thus in the direction of the arrow 26 would therefore endeavor to pivot the pivotable drive lever 10 downwardly in the direction of the arrow 17, which presses the end 23 of the pivot lever 22 even more strongly against the edge 25, however, and is thus blocked.

For the opening, the respective pull-push bar 7 is pushed transversely outwardly in the direction of the arrow 27, whereby the actuation lever 19 is outwardly pivoted around the axis 20 and in this process takes along the pivot lever 22 held at a fixed angle thereto at an angular measure of an equal size. The end 23 of said pivot lever remote from its pivot axis rolls off on the back 24 of the pivotable drive lever 10. In this connection, it is only necessary to work against the spring force 15 until the surpassing of the dead center; the further opening movement takes place assisted by the spring 15 and therefore requires almost no force effort. The roller 23 moves toward the pivot axis 14 in this process. On closing, the pull-push bars 7 are, in contrast, pulled against the direction 27 and the pivotable drive lever 10 is transposed by means of the pivot connector 22 which is movable regionally, that is with its head region, with respect to the pivotable drive lever 14 with a component leading away from the pivot axis 14 of the pivotable drive lever 10. The movement of the pivot lever 22 configured in cam-like form is the pivot movement around the axis 20, with the head 23 of the pivot lever 22 being guided on a circular path and thus transposing the pivotable drive lever 10 against the spring force in a stepless manner and with a linearly increasing force effort (Hooke's Law) without force jumps. Only a low required force effort also results due to the manner and configuration of the pivot movement of the pivot connector 22. Alternatively, the pivot conductor 22 or a similar component could also be moved completely toward the vertical central longitudinal plane E.

In any case, the total movement mechanics of the pivot connector 22 can be received within the transverse extent of the pivotable drive lever 10 and can thus not project beyond it in the direction of the plane E. The required constructional space is therefore small.

In accordance with the direction of the introduction of force which is reversed with respect to what is known here, the or each hook-like engagement member 6 is pivotably movable for its opening with a component facing transversely in the direction of the vertical central longitudinal plane E.

The vehicle as shown in the illustrated embodiment and described herein is a soft top. It should, however, be readily appreciated by those having ordinary skill in the art that the top may also be a hard top having rigid panels instead of a flexible cover, or a hybrid top having a combination of rigid panels and a flexible cover. Further, the vehicle as described herein may be a two seater or have a larger interior space with two seating rows behind one another.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A convertible vehicle comprising a roof that is movable between a closed position extending over a passenger compartment in the vehicle and an open position disposed in a storage space adjacent the passenger compartment, said roof comprising:
    at least one movable engagement member for releasably holding the roof in the closed position,
    a spring-loaded pivotable drive lever movable about a pivot axis with respect to the roof, the drive lever being operatively coupled to the engagement member for movement of the engagement member into or out of an engagement position,
    wherein the pivotable drive lever is transposable by way of at least one pivot connector, the pivot connector being engagable with the pivotable drive lever to cause movement of the pivot drive lever against a force applied by a spring at least regionally with a component leading away from the pivot axis of the pivotable drive lever.

2. A convertible vehicle in accordance with claim 1, wherein the pivot connector is configured in the manner of a cam for engaging and causing movement of the pivotable drive lever.

3. A convertible vehicle in accordance with claim 2, wherein an end of the pivot connector spaced apart from its pivot axis is rollable or slidable at a back portion of the pivotable drive lever.

4. A convertible vehicle in accordance with claim 3, wherein the end of the pivot connector is provided with a roller.

5. A convertible vehicle in accordance with claim 4, wherein the pivot connector runs through an angular position disposed perpendicular to its plane of extent during its influencing of the pivotable drive lever and the back portion provides an abutment for the tip of the pivot connector at the pivotable drive lever at least in the closed position of the roof.

6. A convertible vehicle in accordance with claim 5, having at least two movable engagement members and at least one actuation member for actuation of the engagement members, the at least one actuation member being in operative communication with the pivot connectors for the transfer of an actuation force via force communicators outwardly engaging in each case with a component in the transverse direction of the vehicle.

7. A convertible vehicle in accordance with claim 6, wherein the force communicators are made as pull-push bars.

8. A convertible vehicle in accordance with claim 7, wherein the or each pivotable drive lever is pre-tensioned and pulling at the force communicator counteracts the spring force.

9. A convertible vehicle in accordance with claim 8, wherein the pull-push bars engage in each case at their outwardly engaging ends via joints at a pivotable actuation lever which is disposed on the same axis as the respective pivot connector for the actuation of the pivotable drive lever.

10. A convertible vehicle in accordance with claim 9, wherein the or each engagement member is in communication with a control lever in addition to the pivotable drive lever.

11. A convertible vehicle in accordance with claim 10, wherein the control lever is movable about a pivot axle that is parallel to the pivot axis of the pivotable drive lever.

12. A convertible vehicle in accordance with claim 11, wherein the or each engagement member is pivotally coupled to both the control lever and the pivotable drive lever.

13. A convertible vehicle in accordance with claim 11, wherein the or each engagement member is configured in the form of a hook and opens for its opening with a component facing transversely in the direction of a vertical central longitudinal plane.

* * * * *